United States Patent
Sowa et al.

(10) Patent No.: US 10,108,627 B1
(45) Date of Patent: Oct. 23, 2018

(54) MULTI-USER CAX WITH USER DEFINED FUNCTIONS

(71) Applicant: United Technologies Corporation, Hartford, CT (US)

(72) Inventors: William A. Sowa, Simsbury, CT (US); Joshua Daniel Winn, Ellington, CT (US); Charles Gregory Jensen, Provo, UT (US)

(73) Assignee: United Technologies Corporation, Farmington, CT (US)

( * ) Notice: Subject to any disclaimer, the term of this patent is extended or adjusted under 35 U.S.C. 154(b) by 479 days.

(21) Appl. No.: 14/617,977

(22) Filed: Feb. 10, 2015

Related U.S. Application Data

(60) Provisional application No. 61/938,187, filed on Feb. 11, 2014.

(51) Int. Cl.
*G06F 17/30* (2006.01)
(52) U.S. Cl.
CPC .............. *G06F 17/30091* (2013.01)
(58) Field of Classification Search
CPC ............ G06F 17/30; G06F 17/30091
USPC ............................................. 707/600–899
See application file for complete search history.

(56) References Cited

U.S. PATENT DOCUMENTS

| | | |
|---|---|---|
| 8,229,715 B1 | 7/2012 | Teller et al. |
| 8,566,066 B2 | 10/2013 | Thompson et al. |
| 2013/0144566 A1 | 6/2013 | De Biswas |
| 2014/0024464 A1* | 1/2014 | Belakovsky ............ A63F 13/60 463/43 |
| 2014/0222387 A1 | 8/2014 | Cannon et al. |
| 2014/0222919 A1 | 8/2014 | Nysetvold et al. |

OTHER PUBLICATIONS

Xu, Yue. (2010). A Flexible Context Architecture for a Multi-User GUI. Department of Mechanical Engineering, Brigham Young University, Dec. 2010.

Red, E., French, D., Hepworth, A., Jensen, G., Stone, B. (2014). Multi-User Computer-Aided Design and Engineering Software Applications. Cloud-Based Design and Manufacturing (CBDM), Springer International Publishing, Jan. 1, 2014, pp. 25-62.

Red, E., Jensen, G., Ryskamp, J., Mix, K. (2010). NXConnect: Multi-User CAx on a Commercial Engineering Software Application. Department of Mechanical Engineering, Brigham Young University.

\* cited by examiner

*Primary Examiner* — Issac M Woo
(74) *Attorney, Agent, or Firm* — Carlson, Gaskey & Olds, P.C.

(57) ABSTRACT

A system for collaborating on a component according to an exemplary aspect of the present disclosure includes, among other things, a multi-user CAx environment including a data module and an editing module. The data module is configured to access a database corresponding to a component design. The component design corresponds to a group of predetermined functions. The editing module is configured to generate at least one user-defined function operable to characterize the component design, and configured to cause the data module to store data corresponding to the at least one user-defined function to the database. A method for collaborating on a component design is also disclosed.

17 Claims, 4 Drawing Sheets

MULTI-USER CAX WITH USER DEFINED FUNCTIONS

CROSS-REFERENCE TO RELATED APPLICATIONS

This application claims the benefit of U.S. Provisional Application 61/938,187, filed Feb. 11, 2014.

BACKGROUND

This disclosure relates to computer-aided technologies (CAx), and more particularly, to the characterization of component designs in a computing environment.

CAx software is widely used across a number of industries and there are numerous providers of CAx software with substantially overlapping sets of features. CAx software is used to develop tools, parts, assemblies, structures and other components using a computer system during the design, analysis, and manufacturing phases, for example. CAx software may be used by a user or group of users to build, analyze, and manufacture complex elements. These CAx software applications are generally not compatible with one another and generally allow single users to manipulate the various designs. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a multi-user CAx environment including a data module and an editing module. The data module is configured to access at least one database corresponding to a component design in a memory storage device. The component design corresponds to a group of predetermined functions. The editing module is configured to generate at least one user-defined function operable to characterize the component design, and configured to cause the data module to store data corresponding to the at least one user-defined function to the at least one database.

In a further embodiment of any of the foregoing embodiments, each function of the group of predetermined functions is operable to generate data relating to at least one feature of the component design.

In a further embodiment of any of the foregoing embodiments, the editing module is configured to cause the data module to store at least one user-defined object to the at least one database. The at least one user-defined object is generated in response to execution of the at least one user-defined function.

In a further embodiment of any of the foregoing embodiments, the editing module is configured to generate the at least one user-defined function in response to accessing at least one application programming interface. The at least one application programming interface is operable to associate the at least one user-defined function with the group of predetermined functions, and the at least one user-defined function is provided by an environment configured to execute the editing module.

In a further embodiment of any of the foregoing embodiments, the at least one predefined function is separate and distinct from the group of predetermined functions.

In a further embodiment of any of the foregoing embodiments, the at least one application programming interface is operable to associate the at least one user-defined function with at least two functions of the group of predetermined functions, such that execution of the at least one user-defined function causes execution of the at least two functions of the group of predetermined functions.

A further embodiment of any of the foregoing embodiments includes a display module configured to display a local copy of the component design in a first environment. At least one feature of the local copy generated in response to executing a local function relating to the at least one user-defined function.

In a further embodiment of any of the foregoing embodiments, the first environment is provided with a first function set, and a second environment is provided with the editing module and a second, different function set. The at least one database is configured to store data corresponding to the at least one user-defined function in a neutral format common to the first function set and the second function set. Each of the first function set and the second function set is operable to characterize the component design based on the neutral format.

In a further embodiment of any of the foregoing embodiments, the at least one database is configured to modify the group of predetermined functions to include the at least one user-defined function such that each of the first environment and the second environment accessing the at least one database is able to update the component design in response to executing the at least one user-defined function.

A further embodiment of any of the foregoing embodiments includes a synchronization module configured to communicate data relating to the at least one user-defined function from the at least one database to each environment accessing the component design.

In a further embodiment of any of the foregoing embodiments, the data corresponds to at least one user-defined object generated by the at least one user-defined function. The at least one user-defined object is operable to define a feature of the component design in response to setting at least one parameter of the at least one user-defined object.

A system for collaborating on a component according to an example of the present disclosure includes at least one database in a memory storage device. The at least one database is configured to store data relating to a component design. The component design corresponds to a group of predetermined functions. A synchronization module is configured to communicate data corresponding to at least one user-defined function between at least one database and at least one client environment accessing the component design. The at least one user-defined function is operable to characterize the component design and is distinct from the group of predetermined functions. The synchronization module is configured to be executed by a computing platform including a processor and a memory storage device.

In a further embodiment of any of the foregoing embodiments, the at least one database is operable to link the component design to the at least one user-defined function such that the component design is displayed in response to executing at least one command provided by the at least one client environment.

In a further embodiment of any of the foregoing embodiments, the at least one command is a user-defined function corresponding to the at least one client environment, and the user-defined function is distinct from the group of predetermined functions.

A further embodiment of any of the foregoing embodiments includes a part management service module operable to translate the at least one user-defined function between a client format native to the at least one client environment and a neutral format common to the at least one database and each of the at least one client environment.

In a further embodiment of any of the foregoing embodiments, the data corresponds to at least one user-defined object generated by the at least one user-defined function. The at least one user-defined object is operable to define a feature of the component design in response to at least one parameter of the at least one user-defined object being set.

A method for collaborating on a component according to an example of the present disclosure includes accessing a component design in at least one database. The component design corresponds to a group of predetermined functions causing data relating to at least one user-defined feature to be stored in the at least one database. The at least one user-defined feature is operable to characterize the component design.

In a further embodiment of any of the foregoing embodiments, the data relates to at least one user-defined object generated by the at least one user-defined function. The at least one user-defined object is operable to define a feature of the component design in response to setting at least one parameter of the at least one user-defined object.

In a further embodiment of any of the foregoing embodiments, the at least one database is operable to link the component design to the at least one user-defined function such that the component design is displayed in at least one client environment in response to executing at least one command relating to the at least one user-defined function.

A further embodiment of any of the foregoing embodiments includes translating the at least one user-defined function between a client format native to at least one client environment accessing the component design and a neutral format common to the at least one database and the at least one client environment.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
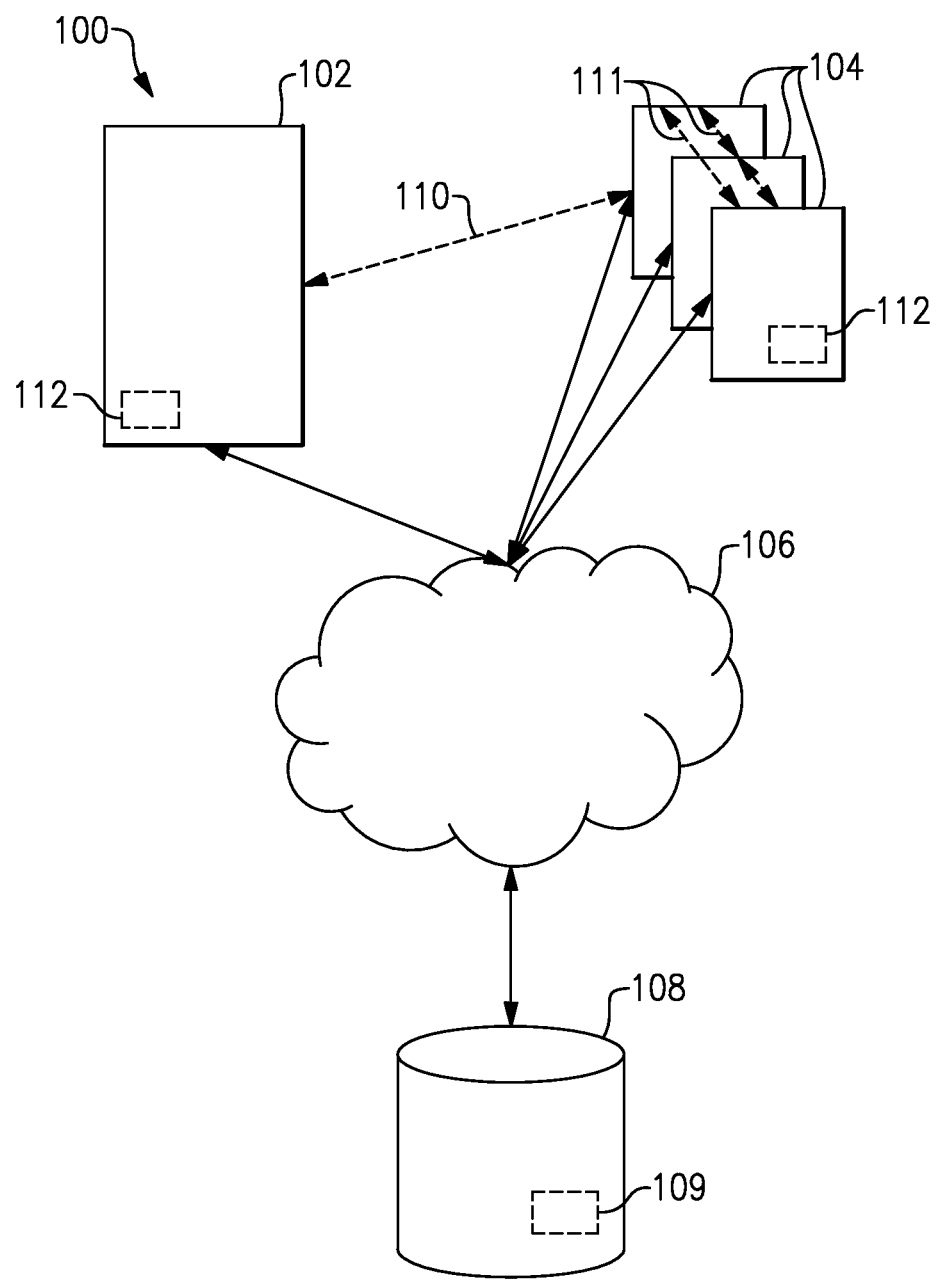
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for embodiment. Accordingly, it may be desirable to limit access to aspects of a component design depending on the level(s) of access provided to a particular user profile. In some embodiments, each user profile corresponds to one or more access lists setting the level(s) of access for each user profile.

Figure 2A:
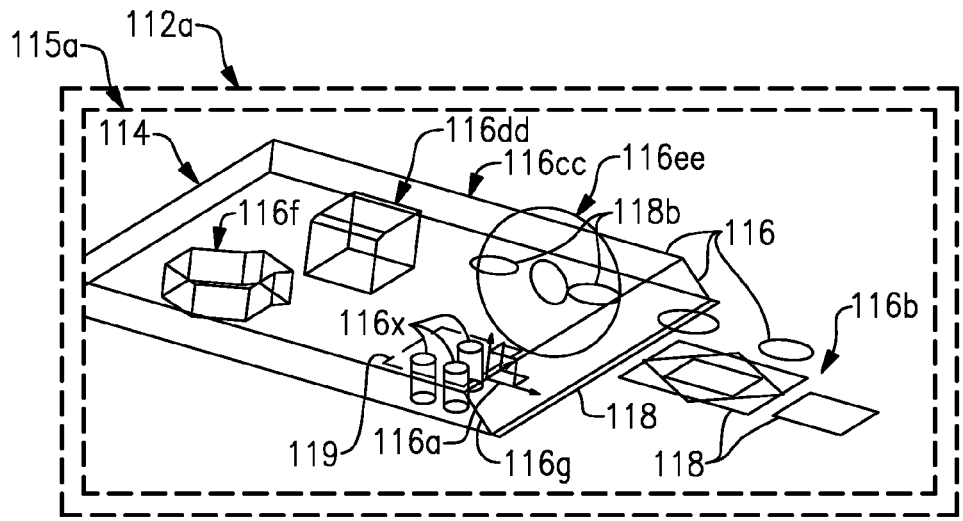
FIG. 2A illustrates a sample component design displayed in a first CAx environment, according to an embodiment.
Figure 2B:
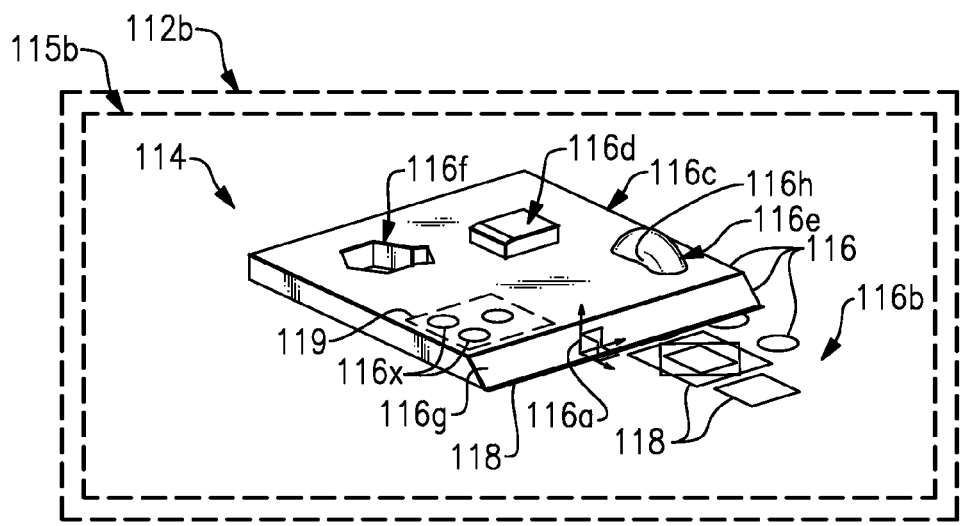
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The sample component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

In some embodiments, a multi-user CAx environment, such as one of the CAx environments 112a, 112b of FIGS. 2A-2B, includes or is otherwise provided with a multi-user command set operable to permit the CAx environment 112 to collaborate on a component design 114 with other CAx environments 112 in a multi-user CAx system. The multi-user CAx environment may also include or is otherwise provided with a native or local command set operable to edit, create or otherwise characterize various aspects of a component design 114. The multi-user CAx command set is mapped to at least some of the local CAx command set such that the user is able to cause one or more commands in the local CAx command set to execute to generate one or more features of a component design 114 while in a multi-user mode.

A user provided with a CAx environment 112 may desire to characterize various aspects of a component design 114 in a manner not otherwise provided or previously defined in the CAx environment 112. The user may therefore create, develop, define or otherwise utilize one or more user defined functions (UDFs) to characterize various aspects of a component design, which may be operable to generate one or more corresponding user defined objects (UDOs), thus achieving a new state. The term "user defined function" (UDF) refers to one or more commands or operations that are defined, created or designated by a user or CAx environment that do not have corresponding predefined function calls in a multi-user CAx application programming interface (API), tool, library or instruction set provided to a multi-user CAx environment. The term "user defined object" (UDO) refers to a result of one or more UDFs and may be characterized by one or more parameters or attributes. Utilizing the techniques discussed below, one or more users provided with a multi-user CAx environment can characterize various aspects of a component design in an efficient manner by reusing or sharing the UDFs and/or UDOs.

Figure 3:
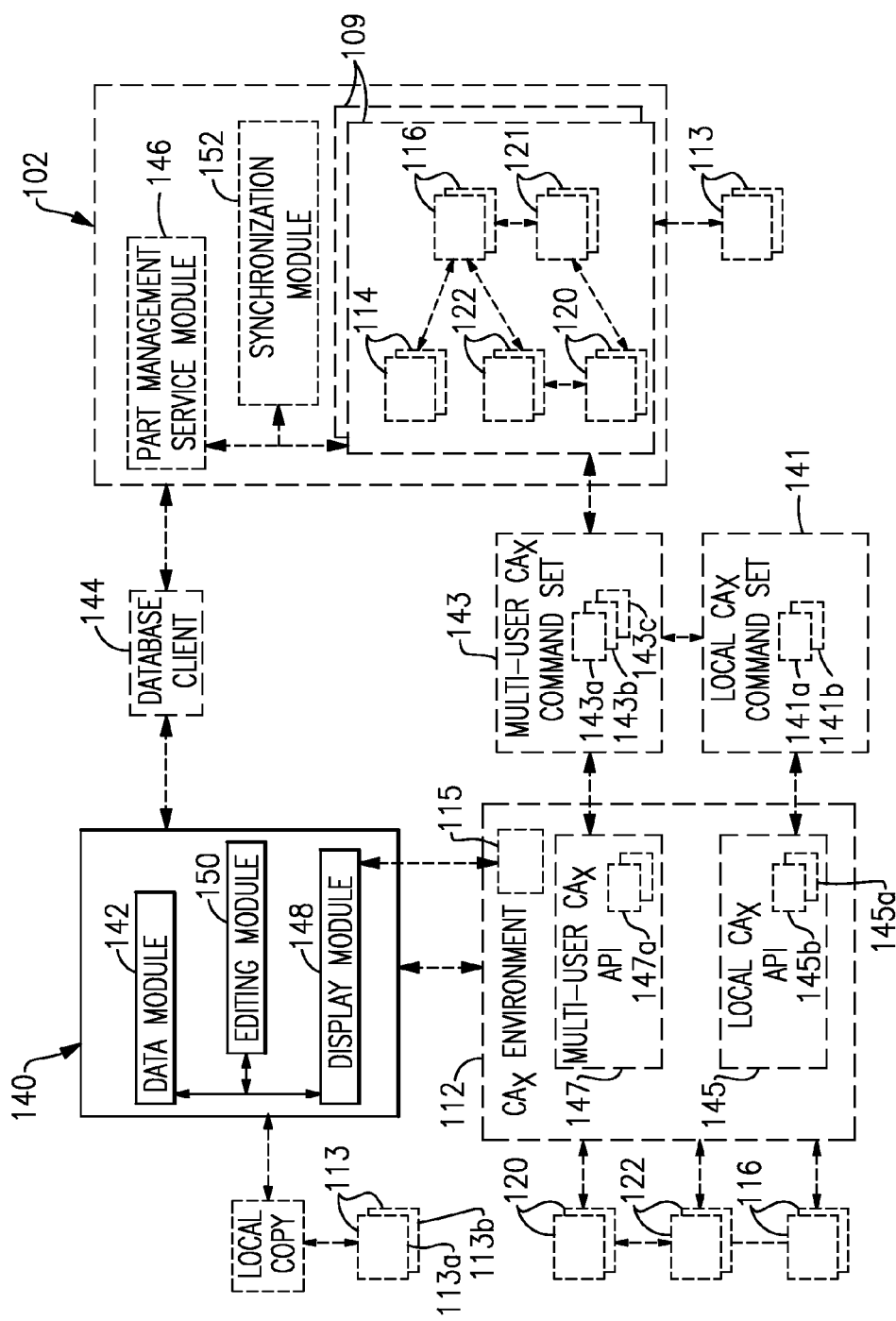
FIG. 3 illustrates a system for characterizing a component design with user defined functions, according to an embodiment.

FIG. 3 illustrates a CAx package 140 for characterizing a component design 114 with one or more UDFs 120 or UDOs 122, such as between CAx environments 112a, 112b shown in FIGS. 2A-2B, according to an embodiment. The CAx package 140 is configured to communicate various data between one or more CAx environments 112 such that each of the CAx environments 112 is able to create, edit, display and/or otherwise interact with the one or more UDOs or related features 116 generated by one or more corresponding UDFs.

In some embodiments, the CAx package 140 is provided as a portion of a CAx software tool integrated into, or integrated with, a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to access, store and/or display data corresponding to one or more component designs 114. Each of these modules includes executable software instructions and/or digital or analog hardware circuitry.

The CAx package 140 includes a data module 142 configured to access, retrieve and/or store data corresponding to one or more component designs 114. In one embodiment, the data module 142 is configured to interface with or otherwise interact with a database client 144 to access one or more databases 109. In another embodiment, the data module 142 and/or database client 144 is configured to interface with various middle tier services, such as authentication service(s), to store, retrieve or otherwise access data corresponding to a component design 114 in one or more databases 109.

In some embodiments, the data is stored in the database 109 as one or more tables, records or entries. In other embodiments, the data is stored in one or more part files 113 and is accessible by referencing one or more objects or memory locations referenced by the one or more records or entries. In one embodiment, each part file 113 or record includes data corresponding to at least one feature 116, such as any of the feature types discussed in this disclosure. In other embodiments, each database 109 organizes the data in one or more tables that include a list of part files 113 linked to a list of features 116 corresponding to a component design 114 and/or part file 113, and a list 121 of feature types or function-based commands corresponding to the features 116, for example.

In one embodiment, the data module 142 is configured to create a local copy 117 of the data, which is updated or synchronized with modifications to various aspects of the component design 114 periodically or in real-time utilizing various techniques. In some embodiments, the local copy 117 includes one or more part files 113. In some embodiments, the local copy 117 includes separate part files 113, such as part files 113*a*, 113*b*, in different data formats. In one embodiment, the data module 142 is configured to cache data such that accessing the database 109 does not cause data corresponding to additions or changes to the component design(s) 114 and/or corresponding feature(s) 116 in the local copy 117 to update unless at least one predefined condition is met, such as the utilization of a checkpoint or timestamp set for the corresponding component design(s) 114, for example. In some embodiments, the data module 142 is configured to reload the local copy 117 with data from the database 109 when the at least one predefined condition is met.

In some embodiments, the CAx package 140 includes a display module 148. The display module 148 is configured to display data corresponding to one or more component designs 114 and/or features 116 within a viewing frustum 115, such as in one of the viewing frustums 115*a*, 115*b* shown in FIGS. 2A-2B. In one embodiment, the display module 148 is configured to display data according to the local copy 117. The display module 148 may be configured to selectively display one or more graphical user interfaces (GUIs) operable to perform various CAx functions provided by the CAx environment 112 and related CAx tools, including the creation, editing or deletion of various aspects of a component design 114. The GUIs may be organized according to the needs of a particular situation in accordance with the teachings of this disclosure.

In some embodiments, the CAx package 140 includes an editing module 150 configured to generate or edit data corresponding to the component design 114. In some embodiments, the editing module 150 selectively causes the data module 142 to communicate data corresponding to the component design 114 between the CAx environment 112 and the database 109 such that the user is able to view, create or edit various aspects of the component design 114 within the CAx environment 112. In one embodiment, the data editing module 150 is configured to selectively cause the data module 142 to store the data to and from the local copy 117.

The editing module 150 is configured to interface with various aspects or functionality of the CAx environment 112 to characterize a component design 114. In some embodiments, the CAx environment 112 is based upon, or is integrated or interfaces with, a CAx software tool such as CATIA, Autodesk®, Solidworks®, Autocad®, or the like. Existing CAx software tools, such as those listed previously, include one or more proprietary, native or local commands or instructions in a native or local CAx command set 141. The native commands are operable to generate, create or edit one or more features 116 of a component design 114 locally in the CAx environment 112.

The CAx environment 112 includes, integrates, interfaces with, or is otherwise provided with, one or more global commands in a multi-user CAx command set 143 to collaborate with other CAx environments 112 in a multi user system. In one embodiment, the multi-user CAx command set 143 is mapped to the local CAx command set 141 such that calls to one or more global commands causes one or more corresponding native commands to execute in the CAx environment 112, or vice versa. In an embodiment, the CAx environment 112 interfaces with the local CAx command set 141 via a local CAx application programming interface (API) 145 and interfaces with the multi-user CAx command set 143 via a multi-user CAx API 147, although other arrangements are contemplated. Each command set 141, 143 and/or API 145, 147 can be programmed in the CAx software directly, provided as one or more software libraries, executables or plug-ins adapted to work with the native CAx software or tool, or provided in a standalone program to interface with the CAx environment 112 to provide the desired solution.

In some embodiments, the CAx environment 112 is configured to execute in at least a multi-user mode and a single-user mode. In the multi-user mode, the editing module 150 is configured to cause at least one command in the multi-user CAx command set 143 to execute to characterize a component design 114, which may cause one or more native or local commands to execute. In the single-user mode, the editing module 150 is configured to cause at least one native or local command in the local CAx command set 141 to execute, thereby creating, editing or otherwise characterizing one or more aspects of a component design 114. In some embodiments, data generated by execution of the local commands is not compatible with the arrangement of the database 109, the multi-user CAx command set 143 and/or the multi-user CAx API 147. In this manner, data generated by execution of the local commands is not synchronized between each CAx environment 112 accessing the component design in the database 109.

The user is able to interact with the CAx environment 112 to cause one or more commands 147*a* in the multi-user CAx API 147 to generate, create or load one or more UDFs 120 or UDOs 122. In some embodiments, the multi-user CAx API 147 includes various commands to characterize UDOs 122, such as setting or otherwise indicating various parameters including geometry, location, orientation, etc., to create or define one or more corresponding user defined feature 116.

Various UDFs 120 and UDOs 122 are contemplated. In some embodiments, the user interacts with the CAx environment 112 to cause one or more commands 147*a* in the multi-user CAx API 147 to group or otherwise designate two or more global commands 143*a*, 143*b* in a multi-user CAx command set 143 to be a UDF 120. In one illustrative embodiment, the UDF is operable to generate cooling holes or passages in an airfoil of a gas turbine engine based on one or more user defined parameters for location, shape, etc. The parameters are related to one or more sketch, extrusion and Boolean feature types, for example. In another illustrative embodiment, the UDF 120 is operable to generate a set of passages 116*x* (shown in FIGS. 2A-2B) based upon input parameters such as designating a surface area 119 and a desired quantity of passages, for example. In this manner, the UDF 120 corresponds to a group of predetermined feature types or commands in the multi-user CAx command set 143 or API 147, but aggregates two or more of the commands to simply their execution.

In another embodiment, the user interacts with the CAx environment 112 to cause one or more commands in the multi-user CAx API 147 to group or otherwise designate two or more local commands 141a, 141b in a local CAx command set 141 or two or more commands such as 145a, 145b in the local CAx API 145 to be a UDF 120. The functionality of the UDF 120 may then be executed by interacting with the multi-user CAx API 147 in a simplified and efficient manner.

In some embodiments, the local command set 141, API 145 or another portion of the CAx environment 112 is modified or otherwise updated to include or access one or more software instructions or algorithms corresponding to one or more UDFs 120. The additional capability may relate to functions not previously available to the CAx environment 112, such as a unique sweep feature, for example. In one embodiment, the additional capability corresponds to a density model or algorithm operable to calculate a density of a particular base feature 116. In one embodiment, the user defined model or algorithm is operable to generate output, which may be provided to an output file or window or graphic in the viewing frustum 115, for example, based upon one or more parameters supported by the local or multi-user CAx command sets 141, 143.

The editing module 150 is configured to cause the data module 142 to store data corresponding to one or more UDFs 120, UDOs 122 and/or related features 116 to the database 109. Various techniques for storing the data are contemplated, including various data formats, based on the needs of a particular situation. In some embodiments, the UDFs 120, UDOs 122 and/or related features 116 are stored into the database 109 in a database format, which may be a global format common with the multi-user CAx command set 143 and/or API 147. The information may be stored so that the information can be accessed and used at a later point in time. A table element containing the UDF 120 or UDO 122 information may be created within the model database 109 to hold the data for future use.

In some embodiments, the data module 142 is configured to store data corresponding to UDFs 120, UDOs and/or related user defined features 116 in a native data format common with the local CAx command set 141 and/or API 145. In this arrangement, each CAx environment 112 provided with the local CAx command set 141 and/or API 145 is able to generate, edit or load various UDOs 122 or user defined features 116 corresponding to UDFs 120, even if other CAx environments 112 in the multi-user system are unable to do so.

In another embodiment, the database 109 is configured to store data corresponding to one or more UDOs 122 or user defined features 116 in a raw, neutral or unwrapped format, which may be stored in the database 109 and/or a part file 113 linked to the database 109 as coordinate data corresponding to geometry of the particular UDO 122 or user defined feature 116. In another embodiment, the data is stored in the database 109 as different record entries and/or part files 113 corresponding to the global and native data formats. This allows a CAx specific wrapper applied by the multi-user CAx API 147, for example, to incorporate the geometry or entities of the UDO 122 or related features 116 into a model in a format that the local or native CAx command set 141 or API 145 recognizes. The UDO 122 or related features 116, when wrapped, may also utilize the parametric definitions provided by the designer and that are available in the local CAx command set 141 or API 145.

In some embodiments, the data module 142 is configured to interface with or otherwise interact with a part management service module 146. The part management service module 146 is operable to translate data corresponding to one or more UDFs 120, UDOs 122 or user defined features 116 between native and global formats, or between two different native formats relating to two different CAx tools, for example.

Rather than embedding the UDF 120 or UDO 122 architecture into the specific feature stored at the local application level, each entity may be stored into the database 109 directly. The technique of storing the entity into the database 109 directly enables a reader/writer capability to manipulate the UDF 120 or UDO 122 at a more abstracted database level. The technique allows UDFs 120 and UDOs 122 to be manipulated in the database 109 using a database query language. The UDF 120 or UDO 122 may also be generated by storing script files within the database 109 that can be called in the CAx environment 112 to auto generate a UDF 120 or UDO 122.

Various techniques for communicating the UDFs 120, UDOs 122 and related data are contemplated. In some embodiments, the multi-user CAx command set 143 includes interoperability commands 143c, which are mapped to or associated with the multi-user CAx API 147, and are operable to store data generated by the local commands to the database 109.

In other embodiments, compression and decompression logic is programmed in the multi-user CAx command set 143 or API 147, data module 142, database client 144, and/or host server 102 or database 109, for example, to communicate data corresponding to UDFs 120, UDOs 122 and/or related features 116 between a CAx environment 112 and the database 109. Additional feature based compression and decompression logic may be created, when a UDF 120 and/or UDO 122 is created, using a programming language accessible to the user that utilizes existing network communication protocols. In one embodiment, each UDF 120 or UDO 122 will have its own unique compression and decompression code. That is, the created UDF 120 or UDO 122 would require creation of unique compression and decompression logic. Various communications protocols are contemplated, such as User Datagram Protocol (UDP), Transmission Control Protocol/Internet Protocol (TCIP/IP), or other network communication protocols (JSON, XML, SOAP, etc.), for example. The UDF 120, UDO 122, and/or corresponding feature(s) 116 is then restored to its original definition by decompressing the transmitted data.

In some embodiments, the data module 142 is configured to selectively reload the local copy 117 in response to another CAx environment 112 storing data corresponding to a UDF 120, UDO 122 and/or corresponding feature 116 to the database 109, or by otherwise receiving related data directly or indirectly from another CAx environment 112.

In some embodiments, the data module 142 and/or database client 144 interfaces or otherwise communicates with a synchronization module 152 configured to communicate data relating to one or more UDFs 120, UDOs 122 and/or user defined features 116 from the database 109 to one or more CAx environments 112 accessing the component design 114. In another embodiment, the synchronization module 152 is configured to cause the UDFs 120 and/or UDOs 122 to replicate on each client CAx environment 112 connected to the multi user CAx system or database 109.

In one embodiment, the synchronization module 152 is configured to cause a portion of the multi-user CAx command set 143 or API 147 to update in response to data relating to one or more UDFs 120 or UDOs 122 being stored in the database 109. The synchronization module 152 may cause a list 121 of function types or function-based commands to update, thereby indicating to the user that particular UDFs 120 and/or UDOs 122 are available in the CAx environment 112. In this manner, the user is able to interact with the CAx environment 112 to cause one or more UDFs 120 to execute to generate new UDOs 122 or user defined features 116 in the CAx environment 112.

Figure 4:
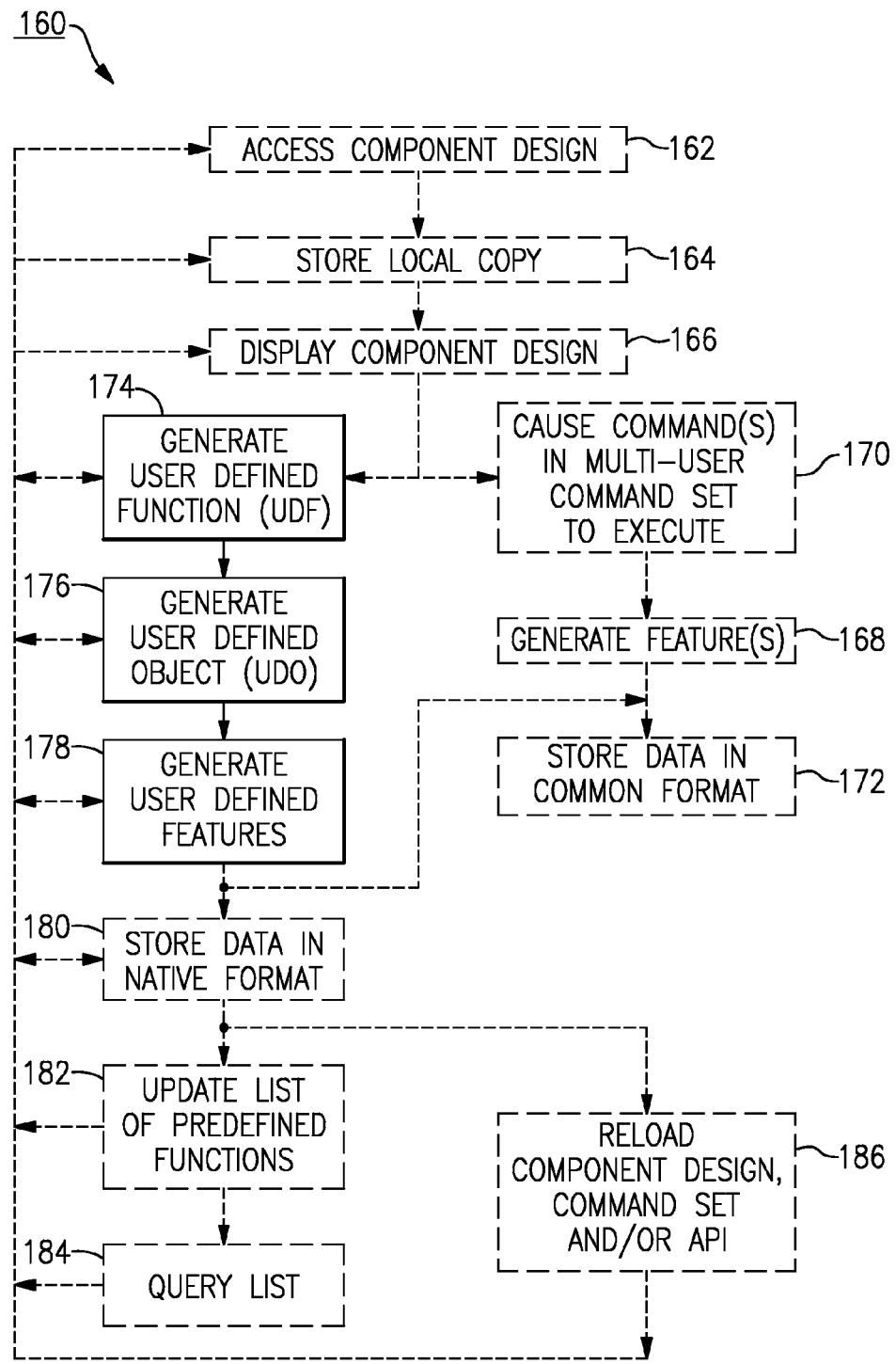
FIG. 4 illustrates a process for characterizing a component design with user defined functions, according to an embodiment.

FIG. 4 illustrates an algorithm 160 in a flowchart implementing the functionality of UDFs and UDOs to characterize a component design, utilizing any of the techniques described in this disclosure and the CAx package 140 shown in FIG. 3 according to the process flow of FIG. 4, according to an embodiment. In some embodiments, the algorithm 160 is executed at least in part within a multi-user CAx environment, such as one of the CAx environments 112a, 112b shown in FIGS. 2A-2B, or a CAx host and/or server 102.

In some embodiments, a CAx environment accesses data corresponding to a component design from at least one database at block 162, and stores a local copy of the data in the CAx environment at block 164. The CAx environment may display data corresponding to the component design according to the local copy, for example, at block 166.

A user is able to interact with the CAx environment to cause one or more features to be generated at block 168. The features correspond to a group of predefined function types or feature-based commands. In some embodiments, the features are generated in response to one or more global commands in a multi-user CAx command set or API to execute at block 170. One or more local or native commands in a local or native CAx command set or API may execute in response to executing the one or more global commands. Data corresponding to the features may be stored in the database in a common format, or are communicated directly to another CAx environment, for example, at block 172.

A user is able to interact with the CAx environment to cause one or more UDFs to be created or otherwise defined at block 174. A user is further able to interact with the CAx environment to cause one or more UDOs to be generated in response to causing one or more corresponding UDFs to execute at block 176. The user is able to interact with the CAx environment to cause one or more user defined features to be generated or edited in response to causing one or more corresponding user defined functions to execute, or by characterizing one or more user defined objects, at block 178.

Data corresponding to the UDFs, UDOs and/or related features may be stored in a common format at block 172, or instead in a native format at block 180. In some embodiments, the UDF or UDO will create expected output that is sent to the database or a related host or server using a compression/decompression process, for example. The database or a related server will store all required data in a model database entry created for this UDF or UDO and may forward related data to all client CAx environments connected to the multi user system using compression and decompression processes.

In some embodiments, at block 182 a list of predefined functions or commands is updated in the database 109, multi-user CAx command set and/or API, such that CAx environments accessing the database 109 or otherwise collaborating on the component design are able to identify, execute or otherwise select various UDFs and/or UDOs previously generated or defined by querying a list at block 184, for example. In some embodiments, at block 186 one or more CAx environments collaborating on the component design, or accessing the database, reload the multi-user command set, multi-user API and/or component design, thereby permitting the CAx environment to execute or load the UDFs and/or UDOs. The command sets or APIs may also be reloaded by querying the list of available function types or function-based commands, for example, although other techniques for synchronizing the command sets and APIs are contemplated.

The algorithm 160 can be programmed in the CAx software directly, provided as one or more software plug-ins adapted to work with the native CAx software, or provided in a standalone program to interface with a CAx package to provide the desired solution. While the CAx package 140 and the algorithm 160 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running a multi-user CAx environment 112 can be programmed with multiple additional tools, and the various features and tools included can be configured to interoperate with each other according to known principles. The specific UDF or UDO functionality may be programmed at each location shown in FIG. 3 to support the creation of the UDFs or UDOs, transmission of the UDF data or UDO across the network, and storage of the UDF data and UDO in the database 109.

Although the above embodiments illustrate a specific component, embodiments of this disclosure are not limited to those particular combinations. One skilled in the art having the benefit of this disclosure will recognize that it is possible to use some of the components or features from one of the examples in combination with features or components from another one of the examples. Furthermore, various embodiments may include one or more examples within them, while other embodiments may include a different subset of examples. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
    a computing device configured to execute a multi-user CAx environment including a data module and an editing module;
    wherein the data module is configured to access at least one database corresponding to a component design in a memory storage device, the component design corresponding to a group of predetermined functions;
    wherein the editing module is configured to generate at least one user-defined function operable to characterize the component design, and configured to cause the data module to store data corresponding to the at least one user-defined function to the at least one database; and
    wherein the at least one user-defined function is separate and distinct from the group of predetermined functions, and the at least one user-defined function does not have any predefined function cells in a multi-user CAx application programming interface provided to the multi-user CAx environment for collaborating on the component design with another multi-user CAx environment.

2. The system as recited in claim 1, wherein each function of the group of predetermined functions is operable to generate data relating to at least one feature of the component design.

3. The system as recited in claim 1, wherein the editing module is configured to cause the data module to store at least one user-defined object to the at least one database, wherein the at least one user-defined object is generated in response to execution of the at least one user-defined function.

4. The system as recited in claim 3, wherein the editing module is configured to generate the at least one user-defined function in response to accessing at least one application programming interface, the at least one application programming interface is operable to associate the at least one user-defined function with the group of predetermined functions, and the at least one user-defined function is provided by an environment configured to execute the editing module.

5. The system as recited in claim 4, wherein each function of the group of predetermined functions is operable to generate data relating to a plurality of features of the component design, each feature of the plurality of features corresponding to a respective feature type of a plurality of feature types.

6. The system as recited in claim 1, comprising a display module configured to display a local copy of the component design in a first environment, at least one feature of the local copy generated in response to executing a local function relating to the at least one user-defined function.

7. The system as recited in claim 6, wherein:
the first environment is provided with a first function set;
a second environment is provided with the editing module and a second, different function set; and
the at least one database is configured to store data corresponding to the at least one user-defined function in a neutral format common to the first function set and the second function set, and each of the first function set and the second function set is operable to characterize the component design based on the neutral format.

8. The system as recited in claim 7, wherein the at least one database is configured to modify the group of predetermined functions to include the at least one user-defined function such that each of the first environment and the second environment accessing the at least one database is able to update the component design in response to executing the at least one user-defined function.

9. The system as recited in claim 1, further comprising a synchronization module configured to communicate data relating to the at least one user-defined function from the at least one database to each environment accessing the component design.

10. The system as recited in claim 9, wherein the data corresponds to at least one user-defined object generated by the at least one user-defined function, the at least one user-defined object operable to define a feature of the component design in response to setting at least one parameter of the at least one user-defined object.

11. The system as recited in claim 1, comprising:
a synchronization module configured to communicate data corresponding to the at least one user-defined function between the at least one database and the multi-user CAx environment; and
wherein the synchronization module is configured to be executed by a computing platform including a processor and a memory storage device.

12. The system as recited in claim 11, wherein the at least one database is operable to link the component design to the at least one user-defined function such that the component design is displayed in response to executing at least one command provided by the multi-user CAx environment.

13. The system as recited in claim 12, wherein the at least one user-defined function includes the at least one command.

14. The system as recited in claim 11, comprising a part management service module operable to translate the at least one user-defined function between a client format native to the multi-user CAx environment and a neutral format common to the at least one database and the multi-user CAx environment.

15. The system as recited in claim 11, wherein the data corresponds to at least one user-defined object generated by the at least one user-defined function, the at least one user-defined object operable to define a feature of the component design in response to at least one parameter of the at least one user-defined object being set.

16. The system as recited in claim 11, wherein the multi-user CAx environment is a first multi-user CAx environment, and the component design is accessible in the at least one database by the first multi-user CAx environment and a second, different multi-user CAx environment.

17. The system as recited in claim 11, wherein the at least one user-defined function relates to an extrusion, a sweep, a sketch, or a density model operable to calculate a density of a feature of the component design.

* * * * *